United States Patent
Hendrickson et al.

(10) Patent No.: US 7,703,346 B2
(45) Date of Patent: Apr. 27, 2010

(54) MULTI-SPEED TRANSMISSION WITH COUNTERSHAFT GEARING

(75) Inventors: James D. Hendrickson, Belleville, MI (US); John A. Diemer, Farmington Hills, MI (US); Douglas John Dwenger, Romulus, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 318 days.

(21) Appl. No.: 11/678,033

(22) Filed: Feb. 22, 2007

(65) Prior Publication Data

US 2008/0202265 A1    Aug. 28, 2008

(51) Int. Cl.
*F16H 3/08* (2006.01)
(52) U.S. Cl. .......................................... 74/331; 74/330
(58) Field of Classification Search .................. 74/329, 74/330, 331, 335, 340
See application file for complete search history.

(56) References Cited

U.S. PATENT DOCUMENTS

| | | | |
|---|---|---|---|
| 4,461,188 A | 7/1984 | Fisher | |
| 4,527,678 A | 7/1985 | Pierce et al. | |
| 4,790,418 A | 12/1988 | Brown et al. | |
| 5,613,401 A | 3/1997 | Maurizio | |
| 6,209,407 B1 * | 4/2001 | Heinzel et al. | 74/331 |
| 6,958,028 B2 | 10/2005 | Janson et al. | |
| 7,021,169 B2 * | 4/2006 | Kobayashi | 74/333 |
| 7,080,567 B2 | 7/2006 | Hatakeyama | |
| 7,155,994 B2 | 1/2007 | Gumpoltsberger | |
| 7,225,695 B2 | 6/2007 | Gumpoltsberger et al. | |
| 7,225,696 B2 | 6/2007 | Gitt | |
| 7,240,578 B2 | 7/2007 | Ogami et al. | |
| 7,246,534 B2 * | 7/2007 | Kim et al. | 74/330 |
| 7,272,985 B2 | 9/2007 | Gumpoltsberger et al. | |
| 7,287,442 B2 | 10/2007 | Gumpoltsberger et al. | |
| 7,340,973 B2 | 3/2008 | Hiraiwa | |
| 7,383,749 B2 | 6/2008 | Schafer et al. | |
| 7,409,886 B2 | 8/2008 | Gitt | |
| 7,437,963 B2 | 10/2008 | Haka et al. | |
| 7,448,290 B2 | 11/2008 | Gitt | |
| 2004/0144190 A1 | 7/2004 | Hall | |
| 2005/0000307 A1 * | 1/2005 | Gumpoltsberger | 74/331 |
| 2005/0103140 A1 | 5/2005 | Gumpoltsberger | |
| 2005/0115344 A1 * | 6/2005 | Kim et al. | 74/331 |
| 2005/0115345 A1 | 6/2005 | Gumpoltsberger et al. | |
| 2005/0193848 A1 * | 9/2005 | Gitt | 74/340 |
| 2005/0204840 A1 * | 9/2005 | Soeda | 74/330 |
| 2006/0117882 A1 | 6/2006 | Gitt | |
| 2006/0174722 A1 | 8/2006 | Terai | |
| 2006/0219033 A1 | 10/2006 | Gitt | |
| 2006/0266141 A1 | 11/2006 | Ogami | |

(Continued)

FOREIGN PATENT DOCUMENTS

DE    19807374 A1    2/1998

(Continued)

*Primary Examiner*—Roger Pang

(57) ABSTRACT

A transmission is provided having a dual clutch and a countershaft gearing arrangement. The countershaft gearing arrangement includes a plurality of co-planar gears sets having gears that are selectively connectable to at least two countershafts. Moreover, one of the gears of the plurality of co-planar gears sets that provides a reverse gear ratio is selectively connectable to a first countershaft and is in mesh with only one other gear of the plurality of co-planar gears sets that is selectively engagable to a second countershaft.

24 Claims, 2 Drawing Sheets

U.S. PATENT DOCUMENTS

| | | |
|---|---|---|
| 2006/0266144 A1 | 11/2006 | Schafer et al. |
| 2007/0022835 A1 | 2/2007 | Kilian et al. |
| 2007/0113696 A1 | 5/2007 | Haka et al. |
| 2007/0180942 A1 | 8/2007 | Antonov |
| 2008/0047378 A1 | 2/2008 | Borgerson et al. |
| 2008/0134820 A1* | 6/2008 | Bjorck et al. ............... 74/331 |
| 2008/0141808 A1 | 6/2008 | Gumpoltsberger |
| 2008/0196526 A1* | 8/2008 | Singh et al. ............... 74/331 |
| 2008/0202266 A1* | 8/2008 | Hendrickson et al. ......... 74/331 |

FOREIGN PATENT DOCUMENTS

| | | |
|---|---|---|
| DE | 1031047 A1 | 3/2003 |
| DE | 102004055121 A1 | 5/2006 |
| DE | 102006016059 A1 | 10/2007 |
| DE | 102006016397 A1 | 10/2007 |
| EP | 1936234 A1 | 10/2007 |
| WO | WO2005021999 A1 | 3/2005 |
| WO | WO2005093289 A1 | 10/2005 |
| WO | WO2006106534 A1 | 10/2006 |
| WO | WO2006128626 A1 | 12/2006 |
| WO | WO2007087855 A1 | 8/2007 |

* cited by examiner

MULTI-SPEED TRANSMISSION WITH COUNTERSHAFT GEARING

TECHNICAL FIELD

The invention relates to a multi-speed transmission having a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio (with the exception of being able to achieve a direct drive ratio in a rear wheel drive application). Accordingly, the total number of gears required in this typical design is two times the number of forward speeds, plus three for reverse. This necessitates a large number of required gear pairs, especially in transmissions that have a relatively large number of forward speed ratios.

SUMMARY

In an aspect of the present invention, a transmission having an input shaft, a first intermediate shaft, a second intermediate shaft concentric with the first intermediate shaft, a clutch, a first and a second countershaft, a first set of gears, a second set of gears, an output shaft and a first transfer gear is provided. The clutch is selectively engagable to couple the input shaft with one of the first and second intermediate shafts. The first set of gears is connected for common rotation with the first intermediate shaft and intermeshing with a first selectable set of gears to form a first plurality of co-planar gear sets. One of the first set of gears intermeshes with only one of the first selectable set of gears and another of the first set of gears intermeshes with two of the first selectable set of gears to selectively connect for common rotation at least one of the first selectable set of gears with at least one of the first and second countershafts for selectively transferring the torque to the countershafts when the clutch is engaged. The second set of gears is connected for common rotation with the second intermediate shaft and intermeshing with a second selectable set of gears to form a second plurality of co-planar gear sets. Each of the gears of the second selectable set of gears is selectively connectable for common rotation with one of the first and second countershafts for selectively transferring the torque to one of the countershafts when the clutch is engaged. The output shaft is disposed radially outward of the second intermediate shaft. The first transfer gear is coupled to one of the first and second countershafts for transferring torque from the countershaft to the output shaft.

In another aspect of the invention, the first set of gears includes two gears.

In yet another aspect of the invention, the second set of gears further comprises three gears.

In still another aspect of the invention, a second transfer gear is connected for common rotation with one of the first and second countershafts and intermeshing with an output gear connected for common rotation with the output shaft for transferring torque from the countershaft to the output shaft.

In still another aspect of the invention, a plurality of synchronizers for selectively connecting the first and second set of selectable sets of gears to at least one of the countershafts.

In still another aspect of the invention, eight synchronizers for selectively connecting the first and second set of selectable sets of gears to at least one of the countershafts.

In still another aspect of the invention, a final drive unit wherein the final drive unit has an output shaft that is perpendicular to the input member.

In still another aspect of the invention, the clutch is a dual clutch having a first hub connected to the first intermediate shaft and a second hub connected to the second intermediate shaft.

In still another aspect of the invention, a first plurality of co-planar gear sets further includes two co-planar gear sets.

In yet another aspect of the invention, a second plurality of co-planar gear sets further includes three co-planar gear sets.

In yet another aspect of the invention, one of the second plurality of co-planar gear sets transfers the torque to achieve a first forward gear ratio.

In yet another aspect of the invention, one of the second plurality of co-planar gear sets that transfers the torque to achieve the first forward gear ratio is disposed adjacent a structural wall of the housing of the transmission.

In yet another aspect of the invention, one of the second plurality of co-planar gear sets transfers the torque to achieve a seventh forward gear ratio.

In yet another aspect of the invention, one of the second plurality of co-planar gear sets that transfers the torque to achieve the seventh forward gear ratio is disposed adjacent a structural wall of the housing of the transmission.

In still another aspect of the invention, the first plurality of co-planar gear sets is disposed between the clutch and the second plurality of co-planar gear sets.

In still another aspect of the invention, the second plurality of co-planar gear sets is disposed between two walls of a transmission housing.

In still another aspect of the invention, wherein one of the first plurality of co-planar gear sets transfers the torque to achieve a reverse gear ratio.

In still another aspect of the invention, one of the first plurality of co-planar gear sets that transfers the torque to achieve a fourth and a sixth forward gear ratio is disposed adjacent a structural wall of the housing of the transmission.

In still another aspect of the invention, one of the gears of one of the first plurality of co-planar gear sets that transfers the torque to achieve the reverse gear ratio is one of the first selectable set of gears and is connectable for selective common rotation with one of the countershafts and intermeshes with another of the first selectable set of gears that is connectable for selective common rotation with the other of the countershafts.

In yet another aspect of the invention, the first transfer gear is disposed between the first plurality of co-planar gear sets and the clutch.

The above features and advantages and other features and advantages of the present invention are readily apparent from the following detailed description of the best modes for carrying out the invention when taken in connection with the accompanying drawings.

DESCRIPTION

Figure 1:
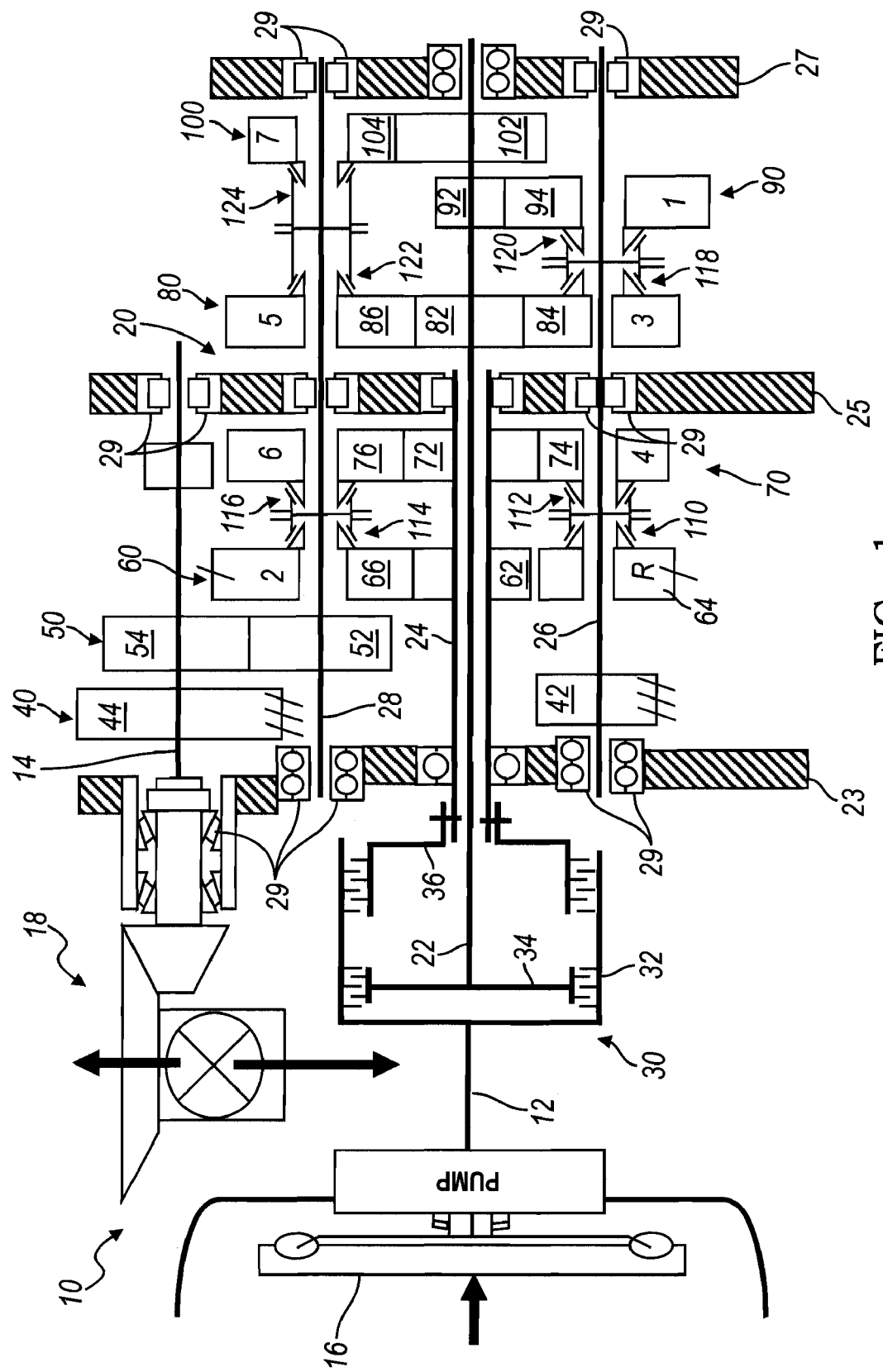
FIG. 1 is a schematic representation of a first embodiment of a transmission in accordance with the present invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit The transmission 10 includes a countershaft gearing arrangement 20 that includes intermediate shafts, countershafts, co-planar intermeshing gear sets and selectively engagable synchronizers as will be described herein. For example, the countershaft gearing arrangement 20 has a first intermediate shaft 22 and a second intermediate shaft 24, which is a sleeve shaft concentric with the first intermediate shaft 22. The countershaft gearing arrangement 20 further includes a first countershaft 26 and a second countershaft 28. The countershafts 26, 28 are both spaced from and parallel with the input shaft 12, the output shaft 14 and the intermediate shafts 22, 24.

The first and second intermediate shafts 22, 24, countershafts 26, 28 and output shaft 14 are supported by a first, second and third support structure or wall 23, 25, 27 formed in the housing of transmission 10. As conventionally known, the walls 23, 25, 27 are fitted with bearings 29 for rotatably supporting the first and second intermediate shafts 22, 24, countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second intermediate shafts 22, 24. The dual clutch 30 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 20 also includes co-planar, intermeshing gear sets 40, 50, 60, 70, 80, 90 and 100. Gear set 40 includes gears 42 and 44. Gear 42 is connected for common rotation with the counter shaft 26 and intermeshes with gear 44. Gear 44 is connected for common rotation with output shaft 14. As shown in FIG. 1, gear set 40 is disposed adjacent wall 23 and transfers torque from first countershaft 26 to output shaft 14.

Co-planar gear set 50 includes gear 52 and gear 54. Gear 52 is connected for common rotation with countershaft 28 and intermeshes with gear 54. Gear 54 is connected for common rotation with output shaft 14. As shown in FIG. 1, gear set 50 is disposed adjacent gear set 40 and transfers torque from second countershaft 28 to output shaft 14.

Gear set 60 includes co-planar intermeshing gears 62, 64 and 66. Gear 62 is connected for common rotation with second intermediate shaft 24 and intermeshes with gear 66. Gear 66 intermeshes with gear 64. Gear 64 is selectively connectable with first countershaft 26. Gear 66 is selectively connectable with second countershaft 28. As shown in FIG. 1, gear set 60 is disposed adjacent gear set 50 and provides second and reverse gear ratios. More specifically, gear 64 driven by gear 66 is configured to produce the reverse gear ratio and gear 66 driven by gear 62 is configured to produce the second gear ratio.

Gear set 70 includes co-planar, intermeshing gears 72, 74 and 76. Gear 72 is connected for common rotation with second intermediate shaft 24. Gear 72 intermeshes with gear 74, which is selectively connectable for common rotation with countershaft 26. Gear 72 also intermeshes with gear 76, which is selectively connectable for common rotation with countershaft 28. As shown in FIG. 1, gear set 70 is disposed adjacent gear set 60 and wall 25 and provides fourth and sixth gear ratios. More specifically, gear 74 driven by gear 72 is configured to produce the fourth gear ratio and gear 76 driven by gear 72 is configured to produce the sixth gear ratio.

Gear set 80 includes co-planar, intermeshing gears 82, 84 and 86. Gear 82 is connected for common rotation with first intermediate shaft 22. Gear 82 intermeshes with both gear 84 and gear 86. Gear 84 is selectively connectable for common rotation with the countershaft 26. Gear 86 is selectively connectable for common rotation with the countershaft 28. As shown in FIG. 1, gear set 80 is disposed adjacent wall 25 and provides third and fifth gear ratios. More specifically, gear 84 driven by gear 82 is configured to produce the third gear ratio and gear 86 driven by gear 82 is configured to produce the fifth gear ratio.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with countershaft 26. As shown in FIG. 1, gear set 90 is disposed adjacent gear set 80 and provides a first gear ratio. More specifically, gear 94 driven by gear 92 is configured to produce the first gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the countershaft 28. As shown in FIG. 1, gear set 100 is disposed adjacent gear set 80 and wall 27 and provides a seventh gear ratio. More specifically, gear 104 driven by gear 102 is configured to produce the seventh gear ratio.

The transmission 10 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 64 with countershaft 26 for common rotation therewith. Synchronizer 112 is selectively engagable to connect gear 74 with countershaft 26 for common rotation therewith. Synchronizer 114 is selectively engagable to connect gear 66 with countershaft 28 for common rotation therewith. Synchronizer 116 is selectively engagable to connect gear 76 with countershaft 28 for common rotation therewith. Synchronizer 118 is selectively engagable to connect gear 84 with countershaft 26 for common rotation therewith. Synchronizer 120 is selectively engagable to connect gear 94 with countershaft 26 for common rotation therewith. Synchronizer 122 is selectively engagable to connect gear 86 with countershaft 28 for common rotation therewith. Synchronizer 124 is selectively engagable to connect gear 104 with countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio.

To establish the reverse torque ratio clutch element 36 of the dual clutch 30 and synchronizer 110 are engaged. By the engagement of clutch element 36 of the dual clutch 30, torque is transferred from the input shaft 12 through clutch housing 32 to the second intermediate shaft 24. Further, torque is transferred from the second intermediate shaft 24 through gear 62 to gear 66. Gear 66 transfers the torque to gear 64. Upon engagement of synchronizer 110, gear 64 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

A first forward torque ratio ($1^{st}$ gear) is achieved by engaging clutch element 34 of the dual clutch 30 and synchronizer 120. By the engagement of clutch element 34 of the dual clutch 30, torque is transferred from input shaft 12 through clutch housing 32 to the first intermediate shaft 22. Further, torque is transferred from the first intermediate shaft 22 to gear 92. Gear 92 transfers the torque to gear 94. Upon engagement of synchronizer 120, gear 94 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

A subsequent forward torque ratio ($2^{nd}$ gear) is established by engagement of clutch element 36 of the dual clutch 30 and synchronizer 114. By the engagement of clutch element 36 of the dual clutch 30, torque is transferred from input shaft 12 through clutch housing 32 to the second intermediate shaft 24. Further, torque is transferred from the second intermediate shaft 24 to gear 62. Gear 62 transfers the torque to gear 66. Upon engagement of synchronizer 114, gear 66 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

The subsequent torque ratio ($3^{rd}$ gear) is established by engagement of clutch element 34 of the dual clutch 30 and synchronizer 118. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 84. Upon engagement of synchronizer 118, gear 84 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

The next subsequent forward torque ratio ($4^{th}$ gear) is established by engagement of clutch element 36 of the dual clutch 30 and synchronizer 112. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 74. Upon engagement of synchronizer 112, gear 74 transfers torque to countershaft 26. Countershaft 26 transfers the torque to gear 42. Gear 42 transfers torque to gear 44, which in turn transfers the torque to output shaft 14. Output shaft 14 transfers the torque to the final drive unit 18.

The subsequent torque ratio ($5^{th}$ gear) is established by engagement of clutch element 34 of the dual clutch 30 and synchronizer 122. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 86. Upon engagement of synchronizer 122, gear 86 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

A subsequent forward torque ratio ($6^{th}$ gear) is established by engagement of clutch element 36 of the dual clutch 30 and synchronizer 116. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 76. Upon engagement of synchronizer 116, gear 76 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

The subsequent torque ratio ($7^{th}$ gear) is established by engagement of clutch element 34 of the dual clutch 30 and synchronizer 124. By the engagement of clutch element 34 of the dual clutch 30, torque is transferred from input shaft 12 through clutch housing 32 to the first intermediate shaft 22. Further, torque is transferred from the first intermediate shaft 22 to gear 102. Gear 102 transfers the torque to gear 104. Upon engagement of synchronizer 124, gear 104 transfers torque to countershaft 28. Countershaft 28 transfers the torque to gear 52. Gear 52 transfers torque to gear 54, which in turn transfers the torque to output shaft 14. Output shaft 14 transfers the torque to the final drive unit 18.

Accordingly, from the above description of the embodiment of the present invention seven co-planar gear sets and eight synchronizers are provided to establish the desired gear ratios. Two of the co-planar gear sets (i.e. gear set 40 and 50) are transfer gears that are configured to transfer torque from the countershafts 26, 28 to the output shaft 14. Gear set 40 and gear set 50 are disposed adjacent each other and gear set 40 is disposed adjacent wall 23. Gear sets 60 and 70 are disposed adjacent gear set 50. Gear set 60 provides the gears to establish reverse gear and second gear. Gear set 70 provides the gears to establish fourth gear and sixth gear. Gear set 80 is disposed adjacent wall 25 and provides the gears to establish fifth gear and third gear. Gear set 90 is disposed adjacent gear set 80 and provides the gears to establish first gear. Gear set 100 is disposed adjacent wall 27 and provides the gears to establish seventh gear.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 42, 44 in one plane and transfer gears 52, 54 in another plane. This arrangement provides the opportunity to achieve the desired gear ratios. Further, flexibility is provided in the selection of gear ratios with respect to $1^{st}$ gear and $7^{th}$ gear, as the gears (92, 94, 102 and 104) that provide these ratios are disposed in two separate planes.

Second Embodiment

Figure 2:
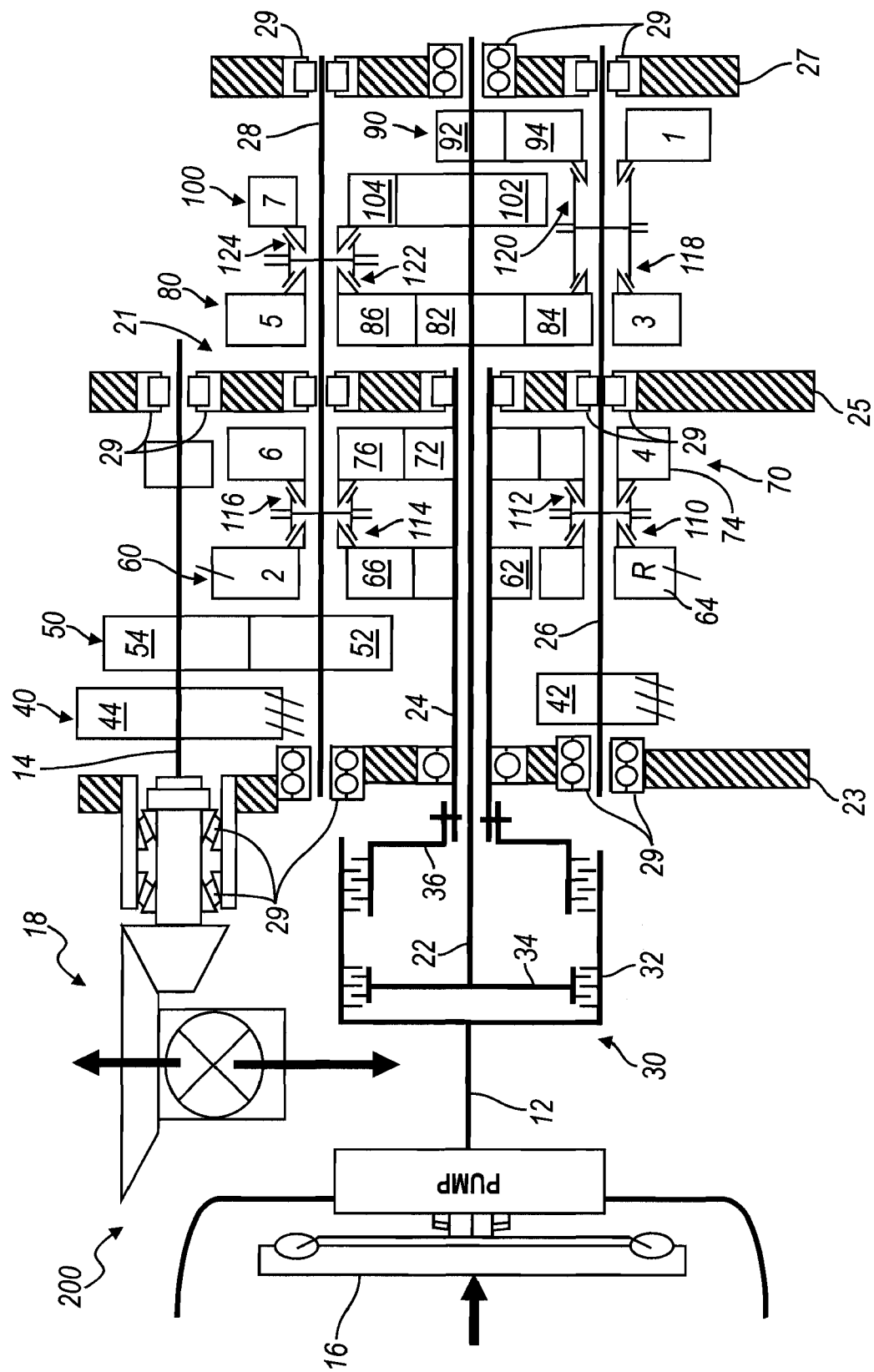
FIG. 2 is a schematic representation of a second embodiment of a transmission in accordance with the present invention.

Referring to the drawings, wherein like reference numbers refer to like components, in FIG. 2 a multi-speed transmission 200 is depicted. The transmission 200 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18.

The transmission 200 includes a countershaft gearing arrangement 21 that is similar in all respects to countershaft gearing arrangement 20 described above including the number, connection and placement of the co-planar gear sets (40, 50, 60, 70, 80 and 90), intermediate shafts (22, 24), countershafts (26, 28) and synchronizers (110, 112, 114, 116, 118, 120, 122 and 124) with the exception of the placement of gear sets 90 and 100. Gear set 90 is disposed adjacent wall 27 and provides gears 92 and 94 to establish first gear. Gear set 100 is disposed adjacent gear set 80 and provides gears 102 and 104 to establish seventh gear.

As in the previous embodiment, a dual clutch 30 is connected between input shaft 12 and first and second intermediate shafts 22, 24. The dual clutch 30 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32 connects the input shaft 12 for common rotation with first intermediate shaft 22 and selective engagement of clutch element 36 with clutch housing 32, connects the input shaft 12 for common rotation with second intermediate shaft 24.

The transmission 200 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these ratios are achieved in the present embodiment from the teaching gained from the description of the previous embodiment.

The present invention contemplates that a variety of torque ratios (i.e., the ratio of torque of the output member 14 to the input member 12) are achievable through the selection of tooth counts of the gears of the transmission 200. Moreover, the present invention advantageously provides the transfer gears 42, 44 in one plane and transfer gears 52, 54 in another plane. This arrangement provides the opportunity to achieve the desired gear ratios. Further, flexibility is provided in the selection of gear ratios with respect to $1^{st}$ gear and $7^{th}$ gear, as the gears (92, 94, 102 and 104) that provide these ratios are disposed in two separate planes. Moreover, the placement of gears 92 and 94, which establish first gear adjacent wall 27 enhances the structural integrity of transmission 200.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input shaft;
a first intermediate shaft;
a second intermediate shaft concentric with the first intermediate shaft;
a clutch selectively engagable to couple the input shaft with one of the first and second intermediate shafts;
a first and a second countershaft;
a first set of gears connected for common rotation with the first intermediate shaft and intermeshing with a first selectable set of gears to form a first plurality of co-planar gear sets, wherein one of the first set of gears intermeshes with only one of the first selectable set of gears and another of the first set of gears intermeshes with two of the first selectable set of gears to selectively connect for common rotation at least one of the first selectable set of gears with at least one of the first and second countershafts for selectively transferring the torque to the countershafts when the clutch is engaged, and wherein one of the first selectable set of gears transfers the torque to achieve a reverse gear ratio and is connectable for selective common rotation with one of the countershafts and intermeshes with another of the first selectable set of gears that is connectable for selective common rotation with the other of the countershafts;
a second set of gears connected for common rotation with the second intermediate shaft and intermeshing with a second selectable set of gears to form a second plurality of co-planar gear sets, wherein each of the gears of the second selectable set of gears is selectively connectable for common rotation with one of the first and second countershafts for selectively transferring the torque to one of the countershafts when the clutch is engaged;
an output shaft disposed radially outward of the second intermediate shaft; and
a first transfer gear coupled to one of the first and second countershafts for transferring torque from the countershaft to the output shaft, and
wherein the first plurality of co-planar gear sets is disposed between the clutch and the second plurality of co-planar gear sets.

2. The transmission of claim 1, wherein the first set of gears further comprises two gears.

3. The transmission of claim 1, wherein the second set of gears further comprises three gears.

4. The transmission of claim 1, further comprising a second transfer gear connected for common rotation with one of the first and second countershafts and intermeshing with an output gear connected for common rotation with the output shaft for transferring torque from the countershaft to the output shaft.

5. The transmission of claim 1, further comprising a plurality of synchronizers for selectively connecting the first and second set of selectable sets of gears to at least one of the countershafts.

6. The transmission of claim 1, further comprising eight synchronizers for selectively connecting the first and second set of selectable sets of gears to at least one of the countershafts.

7. The transmission of claim 1, further comprising a final drive unit wherein the final drive unit has an output shaft that is perpendicular to the input member.

8. The transmission of claim 1, wherein the clutch is a dual clutch having a first hub connected to the first intermediate shaft and a second hub connected to the second intermediate shaft.

9. The transmission of claim 1, wherein the first plurality of co-planar gear sets further comprises two co-planar gear sets.

10. The transmission of claim 1, wherein the second plurality of co-planar gear sets further comprises three co-planar gear sets.

11. The transmission of claim 1, wherein one of the second plurality of co-planar gear sets transfers the torque to achieve a first forward gear ratio.

12. The transmission of claim 11, wherein the one of the second plurality of co-planar gear sets that transfers the torque to achieve the first forward gear ratio is disposed adjacent a structural wall of the housing of the transmission.

13. The transmission of claim 1, wherein one of the second plurality of co-planar gear sets transfers the torque to achieve a seventh forward gear ratio.

14. The transmission of claim 13, wherein the one of the second plurality of co-planar gear sets that transfers the torque to achieve the seventh forward gear ratio is disposed adjacent a structural wall of the housing of the transmission.

15. The transmission of claim 1, wherein the second plurality of co-planar gear sets is disposed between two walls of a transmission housing.

16. The transmission of claim 1, wherein the one of the first plurality of co-planar gear sets that transfers the torque to achieve a fourth and a sixth forward gear ratio is disposed adjacent a structural wall of the housing of the transmission.

17. The transmission of claim 1, wherein the first transfer gear is disposed between the first plurality of co-planar gear sets and the clutch.

18. The transmission of claim 1 wherein a first of the first plurality of co-planar gear sets include a first gear intermeshed with a first selectable gear and include a second selectable gear, and wherein a second of the first plurality of co-planar gear sets include a first gear intermeshed with a first selectable gear and a second selectable gear, wherein the first gears are coupled to the first intermediate shaft, the first selectable gears are selectively connectable to the first countershaft, and the second selectable gears are selectively connectable to the second countershaft.

19. The transmission of claim 18 wherein the first selectable gears of the first and second co-planar gear sets are selectively connectable to the first countershaft by a first synchronizer assembly having a pair of synchronizers and the second selectable gears of the first and second co-planar gear sets are selectively connectable to the second countershaft by a second synchronizer assembly having a pair of synchronizers.

20. The transmission of claim 19 wherein the second selectable gear of the first co-planar gear set is intermeshed with the first selectable gear of the first co-planar gear set in order to provide a reverse gear ratio.

21. The transmission of claim 20 wherein a third of the second plurality of co-planar gear sets include a first gear intermeshed with a first selectable gear and a second selectable gear, wherein the first gear is coupled to the second intermediate shaft, the first selectable gear is selectively connectable to the first countershaft, and the second selectable gear is selectively connectable to the second countershaft.

22. The transmission of claim 21 wherein a fourth and a fifth of the second plurality of co-planar gear sets each include a first gear intermeshed with a first selectable gear, wherein the first gears are coupled to the second intermediate shaft.

23. The transmission of claim 22 wherein the first selectable gear of the fourth co-planar gear set is selectively connectable to the second countershaft and the first selectable gear of the fifth co-planar gear set is selectively connectable to the first countershaft.

24. The transmission of claim 23 wherein the first selectable gears of the third and fifth co-planar gear sets are selectively connectable to the first countershaft by a third synchronizer assembly having a pair of synchronizers and the second selectable gear of the third co-planar gear set and the first selectable gear of the fourth co-planar gear set are selectively connectable to the second countershaft by a fourth synchronizer assembly having a pair of synchronizers.

* * * * *